UNITED STATES PATENT OFFICE.

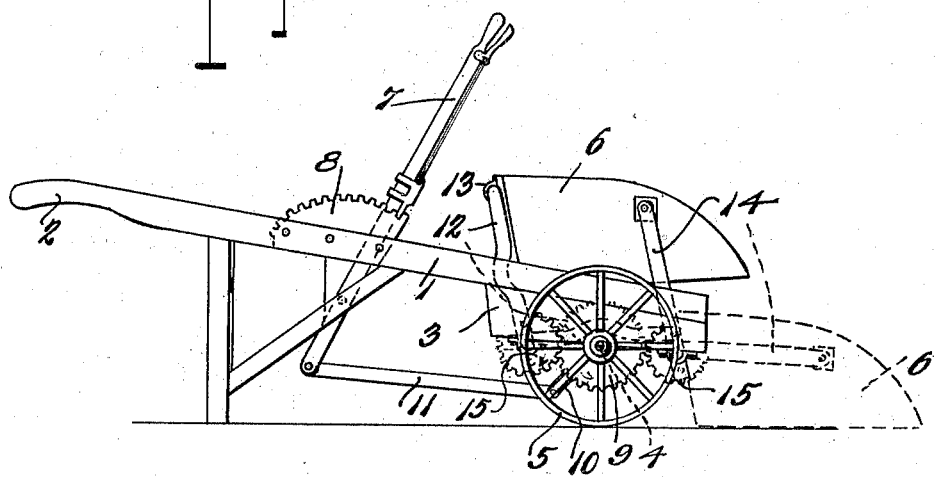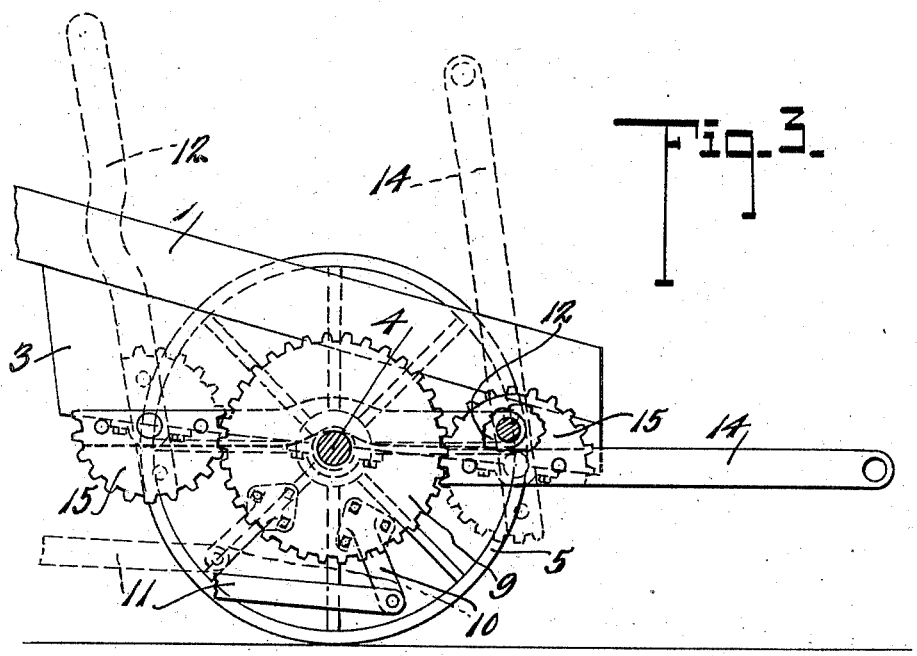

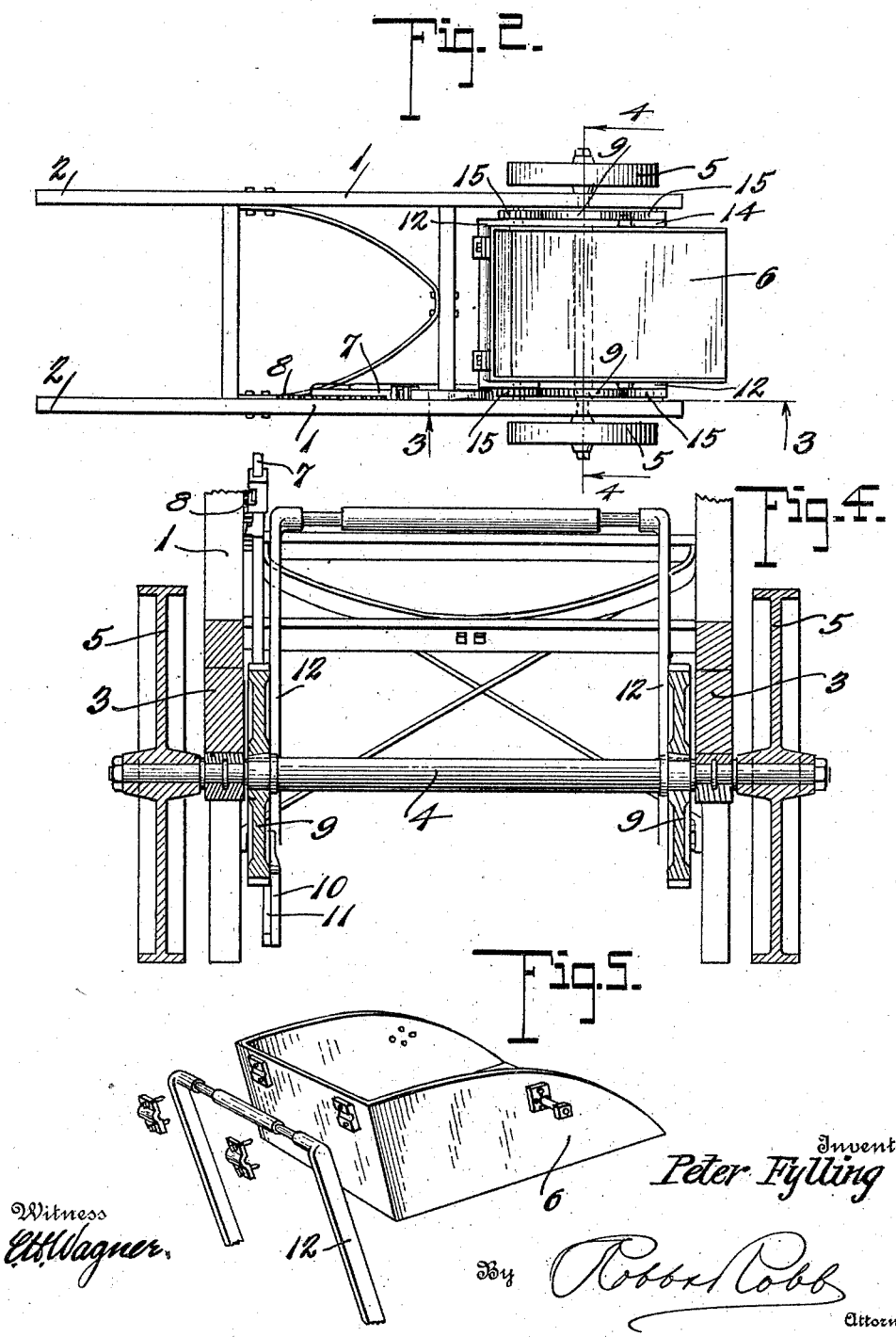

PETER FYLLING, OF LANDA, NORTH DAKOTA.

WHEELBARROW.

1,249,737.   Specification of Letters Patent.   Patented Dec. 11, 1917.

Application filed February 21, 1917. Serial No. 150,183.

*To all whom it may concern:*

Be it known that I, PETER FYLLING, a subject of the King of Norway, residing at Landa, in the county of Bottineau and State of North Dakota, have invented certain new and useful Improvements in Wheelbarrows, of which the following is a specification.

The present invention relates to improvements in wheel-barrows designed particularly for facilitating the operation of loading and carrying materials.

The primary object of my device is to provide such apparatus with a movable body, preferably in the form of a scoop, and normally positioned over the supporting means so as to distribute the weight for balancing by the operator.

It is further comprehended to provide means for shifting the body from this normal carrying position to lowered loading position adjacent to the ground surface and in advance of the vehicle frame whereby the operator may move the scoop into the material to load the same and subsequently raise the load to the carrying position aforesaid.

With the above and other objects in view, this invention consists of the novel construction, combination and arrangement of parts all as hereinafter more fully described, claimed and illustrated in the accompanying drawings, wherein:—

Figure 1 is a side elevation of my device showing in dotted lines the loading position of the body.

Fig. 2 is a top plan view of my device.

Fig. 3 is a fragmentary sectional view on the line 3—3 of Fig. 2.

Fig. 4 is a transverse sectional view on the line 4—4 of Fig. 2.

Fig. 5 is a detail view of the scoop and operating means therefor.

Throughout the following detail description and on the various figures of the drawings, similar parts are referred to by like reference characters.

The apparatus comprises a frame consisting of spaced longitudinal bars 1 terminating at the rear in handles 2, and provided at their forward ends with the supporting blocks 3, axle 4, and wheels 5 constituting supporting elements for the body or scoop 6. The wheels 5 are free to move on the axle 4. Pivotally secured to one side of the frame is the operating member or lever 7. Fastened by any suitable means to the frame is the usual segment 8 which is designed to hold the lever 7 at any adjusted position.

Keyed to the axle 4 and intermediate the supporting bars 1 are the actuating gears 9. Secured to one of the actuating gears 9 is the crank arm 10 connected to the operating lever 7 by the link 11 for operating said actuating gears.

The scoop 6 is provided with the inverted U-shaped supporting arms 12 pivotally connected to the rear wall of the scoop 6 by the boxing 13 adjacent to the top edge thereof, said scoop being also provided forwardly with the supporting arms 14 pivotally secured to the scoop and being also connected adjacent to the top edge thereof. The supporting arms 12 and 14 have fastened to their opposite ends the toothed segments 15 arranged on opposite sides of the actuating gears 9 and meshing therewith.

The operator, in using this device, moves the operating lever 7 to the rear, the gears 9 are made to rotate, in turn actuating the toothed segments 15 meshing therewith. Upon such movement the supporting arms 12 and 14, having fastened at their ends said tooth segments 15, are simultaneously moved forwardly and downwardly to lowered loading position adjacent to the ground surface and in advance of the vehicle frame. When the scoop is thus in lowered loading position adjacent to the ground surface, the operator manually moves the apparatus forwardly pushing the scoop into the loose material for loading the same. The scoop is now raised by operating the lever 7 forwardly shifting the scoop to normal carrying position. The load is thus directly over the supporting axle and may easily be balanced by the operator.

The device is particularly useful in unloading box-cars, as it may be run into the car and by lowering the scoop obtain a load of loose material therefrom, eliminating the necessity of shoveling the material as usually done, and then moved to any dumping place and unloaded. The device is also useful when it is desired to handle heavy articles that would ordinarily be manually lifted into the usual type of wheel-barrow in order to load the same.

Having thus described my invention, what I claim as new is:—

In apparatus of the class described, the combination of a frame, a supporting axle therefor, a body normally disposed in carrying position over the axle, supporting arms at opposite sides of the axle extending upwardly and connected to the body, gears keyed to the axle, toothed segments fastened to the arms, and meshing on opposite sides of said gears, and means for moving the arms forwardly and downwardly to lower the body into loading position in advance of the frame.

In testimony whereof I affix my signature.

PETER FYLLING.

Copies of this patent may be obtained for five cents each, by addressing the "Commissioner of Patents, Washington, D. C."